United States Patent [19]

Bolcavage et al.

[11] 4,273,041
[45] Jun. 16, 1981

[54] BELT PRINTER CONTROL ARCHITECTURE

[75] Inventors: Richard D. Bolcavage, Kirkwood; Armand J. Ferraro, Endicott, both of N.Y.; Arthur E. Fleek, Cary, N.C.

[73] Assignee: International Business Machines Corporation, Armonk, N.Y.

[21] Appl. No.: 115,856

[22] Filed: Jan. 28, 1980

[51] Int. Cl.³ .............................................. B41J 1/20
[52] U.S. Cl. .............................. 101/93.14; 101/93.29; 400/155; 364/900
[58] Field of Search ................. 101/93.14, 93.29, 111; 400/582, 61, 583, 155, 616–616.3; 364/111, 116, 518, 519

[56] References Cited

U.S. PATENT DOCUMENTS

| | | | |
|---|---|---|---|
| 3,629,848 | 12/1971 | Gibson | 390/172.5 |
| 3,777,128 | 12/1973 | Kirkham | 364/111 X |
| 3,845,710 | 11/1974 | Brodruccli | 101/93.14 |
| 3,952,648 | 4/1976 | Sery et al. | 101/93.14 |
| 4,085,837 | 4/1978 | Takano et al. | 400/583 |
| 4,096,578 | 6/1978 | Malkemes | 364/900 |
| 4,109,311 | 8/1978 | Blum et al. | 364/200 |
| 4,153,945 | 5/1979 | Actor et al. | 364/900 |
| 4,218,754 | 8/1980 | Schaeffer | 101/93.14 X |

OTHER PUBLICATIONS

Hays et al., IBM Tech. Discl. Bulletin, vol. 22, No. 1, Jun., 1979, pp. 269–271.
Ballow et al., IBM Tech. Discl. Bulletin, vol. 22, No. 7, Dec., 1979, pp. 2849–2855.

*Primary Examiner*—Edward M. Coven
*Attorney, Agent, or Firm*—John S. Gasper

[57] ABSTRACT

A belt printer control system for attachment to a host system has a first microprocessor connected by a dedicated bus to the host system and control elements operable to perform carriage control, belt drive, and ribbon drive operations of the printer mechanism. A second microprocessor is connected by a dedicated bus structure to controls for operating the print hammers. A common RAM is accessed by the two microprocessors through a common bus structure. The first microprocessor passes control and print information to the RAM for use by the second microprocessor in building print algorithm tables in the RAM for use by the second microprocessor to operate the print hammers. Communication between the microprocessors is done through control information stored by the microprocessors in the common RAM. Storing printing information and building of tables and controlling printing and nonprinting operations of the print mechanism are done concurrently.

33 Claims, 17 Drawing Figures

| Address | Contents |
|---|---|
| 2000 | |
| 2100 | |
| 2200 | |
| 2300 | SUBSCAN TABLE 1 SST1 |
| 2400 | |
| 2500 | |
| 25A0 | \| \| \| SPARE |
| 25C0 | TCB \| SPARE |
| 25E0 | \| SPARE |
| 2600 | |
| 2700 | |
| 2800 | PRINT POSITION FIRE TABLE 1 PPFT 1 |
| 2900 | |
| 2A00 | |
| 2A20 | |
| 2B00 | SPARE |
| 2BE0 | |
| 2C00 | |
| 2D00 | BELT IMAGE ADDRESS TABLE BIAT |
| 2DE0 | |
| 2E00 | |
| 2F00 | BELT IMAGE TABLE BIT |
| 2FC0 | |
| 2FE0 | SPARE |
| 2FFF | |

OCCURRENCE TABLE

| SYMBOL | MEMORY ADDRESS | NUMBER OF OCCURRENCES (OC) | BELT LOCATION 1 | 2 | 3 | 4 | 5 | 6 | 7 | 8 | 9 | 10 | 11 |
|---|---|---|---|---|---|---|---|---|---|---|---|---|---|
| ¢ | 3A 30-31 | 0002 | 00CD | 039D | | | | | | | | | |
| | 32-33 | | | | | | | | | | | | |
| | 34 | | | | 066D | | | | | | | | |
| • | 36 | 0007 | | | | | | | | | | | |
| | 38-39 | | | | | | | | | | | | |
| | 3A-3B | | 008C | 0159 | | | | | | | | | |
| | 3C | | | | | | | | | | | | |
| | 3E | | | | 0226 | 02F3 | | | | | | | |
| | 40 | | | | | | | | | | | | |
| | 42 | | | | | 03C0 | | | | | | | |
| | 44 | | | | | | 048D | | | | | | |
| | 46 | | | | | | | | | | | | |
| | 48 | | | | | | | | | | | | |
| ∨ | 4A | 0002 | 01E0 | 04B0 | | | | | | | | | |
| | 4C | | | | | | | | | | | | |
| | 4E | | | 0780 | | | | | | | | | |
| ı | 50 | 0003 | 017C | | | | | | | | | | |
| | 52 | | | | | | | | | | | | |
| | 54 | | | | | | | | | | | | |
| | 56 | | | 035C | 053C | 071C | | | | | | | |
| | 58 | | | | | | | | | | | | |
| | 5A | | | | | | | | | | | | |
| 0 | 3C BE | 000A | 000F | 00A0 | 0131 | 01C2 | 024E | 02DF | | | | | |
| | 3C C0 | | | | | | | | | | | | |
| | C2 | | | | | | | | | | | | |
| | C4 | | | | | | | | | | | | |
| | C6 | | | | | | | | | | | | |
| | C8 | | | | | | | | | | | | |
| | CA | | | | | | | | | | | | |

FIG. 15 B

|       |      |      |      |      |      |      |      |      |      |      |      |      |
|-------|------|------|------|------|------|------|------|------|------|------|------|------|
| CC    |      |      |      |      |      |      |      |      |      |      |      |      |
| CE    |      |      |      |      |      |      |      |      |      |      |      |      |
| D0    | 0009 |      |      |      |      |      |      |      |      |      |      |      |
| D2    |      |      |      |      |      |      |      |      |      |      |      |      |
| D4    |      |      |      |      |      |      |      |      |      |      |      |      |
| D6    |      | 005A |      |      |      |      |      |      |      |      |      |      |
| D8    |      |      | 00FA | 019A |      |      |      | 0370 |      |      |      |      |
| DA    |      |      |      |      | 023A | 02DA | 037A | 0401 |      |      |      |      |
| DC    |      |      |      |      |      |      |      |      | 0492 | 051E |      |      |
| DE    |      |      |      |      |      |      |      |      |      |      | 05AF |      |
| E0    |      |      |      |      |      |      |      |      |      |      |      |      |
| E2    |      |      |      |      |      |      | 041A |      |      |      |      |      |
| E4    |      |      |      |      |      |      |      | 04BA | 055A |      |      |      |
| E6    |      |      |      |      |      |      |      |      |      | 05FA |      |      |
| E8    |      |      |      |      |      |      |      |      |      |      |      |      |
| EA    |      |      |      |      |      |      |      |      |      |      |      |      |
| EC    | 0006 |      | 00E6 | 01D6 | 02C6 | 0386 | 04A6 | 0596 | 0686 |      |      |      |
| EE    |      |      |      |      |      |      |      |      |      |      |      |      |
| F0    | 0005 |      |      |      |      |      |      |      |      |      |      |      |
| 3A 80 |      | 0023 | 0140 | 0262 | 037F |      |      |      |      |      |      |      |
| 82    |      |      |      |      |      |      |      |      |      |      |      |      |
| 84    |      |      |      |      |      |      |      |      |      |      |      |      |
| 86    |      |      |      |      |      | 04A1 | 05C3 |      |      |      |      |      |
| 88    |      |      |      |      |      |      |      |      |      |      |      |      |
| 8A    |      |      |      |      |      |      |      |      |      |      |      |      |
| 8C    |      |      |      |      |      |      |      |      |      |      |      |      |
| 8E    | 0004 |      |      |      |      |      |      |      |      |      |      |      |
| 3A 9C |      | 0163 | 02BC | 0429 |      |      |      |      |      |      |      |      |
| 9E    |      |      |      | 059B |      |      |      |      |      |      |      |      |
| 3A A0 |      |      |      |      |      |      |      |      |      |      |      |      |
| A2    |      |      |      |      |      |      |      |      |      |      |      |      |
| A4    |      |      |      |      |      |      |      |      |      |      |      |      |

BELT PRINTER CONTROL ARCHITECTURE

DESCRIPTION

TECHNICAL FIELD

This invention relates to line printers and particularly to the control architecture for a line printer subsystem of the type which is designed for interconnection with a host system.

Line printer subsystems normally are interconnected with a host system and are responsive to command and data signals from the host system to perform printing and non-print functions to print lines of data on a print medium. In the past printer operation relied heavily on the host system for control. With the advent of microprocessors more local control is obtainable to free the host system for performing other data processing functions. It is also known to provide some local printing control from a microprocessor or controller which interfaces with a host system. Such local control processors have had very limited control capability, or required that the local control processor be exceptionally large in order to perform all of the control and print functions associated with higher printing operation speeds, interchangeability of type sets, error checking, diagnostics and other control functions. This has been particularly true in connection with line printers utilizing type belt technology.

CROSS REFERENCE TO RELATED PATENT APPLICATIONS

U.S. patent application of R. D. Bolcavage, A. E. Fleek and M. P. Marcus, titled "Line Printer System and Method of Operation With Microprocessor Control", Ser. No. 115,855, filed concurrently herewith on Jan. 28, 1980.

Application of W. W. Boynton and C. J. Weber, titled "Printer Subsystem With Microprocessor Control" Ser. No. 086,484, filed Oct. 19, 1979.

BACKGROUND ART

U.S. Pat. No. 4,096,578, issued June 20, 1978 to C. D. Malkemas, titled "Data System With Microprocessor Featuring Multiplex Data Transfer and Repeat Cycle Driving Arrangements" shows a system for processing data which incorporates a central processing unit and a microprocessor serving as a controller for operating a serial or line printer. The patent discloses a matrix printer and a belt printer operated by a single microprocessor.

In the related application of Boynton and Weber a printer subsystem is disclosed in which a matrix printer is controlled by dual microprocessors which together perform the transfer of information from a host system and operate the printer. The first or front end microprocessor receives data from the host system and processes it through a head image generator and places it in storage for use by the second microprocessor in the control of the printer to print the line of data. The second microprocessor also controls all of the non-print functions related to the operation of the printing mechanism. In the matrix printer subsystem a first microprocessor is essentially a communications microprocessor and the second microprocessor is essentially a control microprocessor. Such an arrangement would restrict the operation of a belt printer at the higher operating speeds it normally demands.

In the related copending application of Bolcavage, Fleek and Marcus a belt printer system is described which uses a single microprocessor for controlling the operation of the belt printer. Essentially this patent application discloses the use of a microprocessor for constructing the print algorithm which uses various print tables which are also part of the printer system of this current application.

Additional representative background art is disclosed and described in the copending application of Bolcavage, Fleek and Marcus and is by cross-reference made a part of this application.

SUMMARY OF THE INVENTION

A printer control system for attachment to a host system comprises two microprocessors controlling all the operations, both printing and non-printing, of a belt printer mechanism. The first microprocessor which is dedicated to communications with the host system and control of non-printing operations of the belt printer mechanism is connected by a first bus structure to the host system and to various control elements which perform non-printing operations of the printer mechanism. The second microprocessor is dedicated to construction of the print algorithm used for printing the print information and for controlling the printing operation of the printer mechanism. A second bus structure connects the second microprocessor to the hammer controls for performing the printing operation of the printer mechanism. A common RAM is connected to the two microprocessors by a common bus structure which is memory mapped into both processors and is accessed in alternate half-cycles of a processor timing clock. The first microprocessor passes print information and control information to the common RAM for use by the second microprocessor for constructing the print algorithm and for controlling the printing operations of the printer mechanism. The first microprocessor also passes control information for its use to control the non-printing operations such as type belt drive, carriage, and ribbon feed operations. The common RAM contains storage for more than one line of print data. The first microprocessor passes print and control information while the second microprocessor is constructing the print algorithm of a previous line of data. The second microprocessor using control information passed to the common RAM by the first microprocessor also predetermines the first subscan in which printing can occur after the completion of the operation of the carriage to feed paper to the desired print line position. The pre-determination of the first print subscan by the second microprocessor is made by using occurrence tables built by the second microprocessor indicating the location of the type characters of the belt and their belt positions. Subscan tables and print position fire tables are built by the second microprocessor for use by it to control the printing operation. The beginning of print operation is controlled by the second microprocessor and occurs from the scan start position determined by the microprocessor from line feed information supplied by the first microprocessor.

In accordance with this arrangement, a printer control system is provided which obtains higher printing speeds while using relatively small capacity microprocessor devices. The host system processor is freed from performing any of the print and non-print operations of the printing mechanism. This arrangement allows virtually all of the printing and non-printing functions to be controlled by microprograms stored in the common RAM and in the memory associated with the microprocessors. This system also permits type belt with different type sets to be readily interchangeable without requiring complex redesign of logic circuits and programming.

The foregoing and other objects, features and advantages of the invention will be apparent from the following more particular description of a preferred embodiment of the invention as illustrated in the accompanying drawing.

BRIEF DESCRIPTION OF THE DRAWINGS

FIGS. 11-13 are memory maps of the RAM storage in FIG. 6 showing various tables used for printing.

FIGS. 15A, 15B & 15C illustrate a portion of an occurrence for a specific belt image.

BEST MODE FOR CARRYING OUT THE INVENTION

Printer System—General Description

Figure 1:
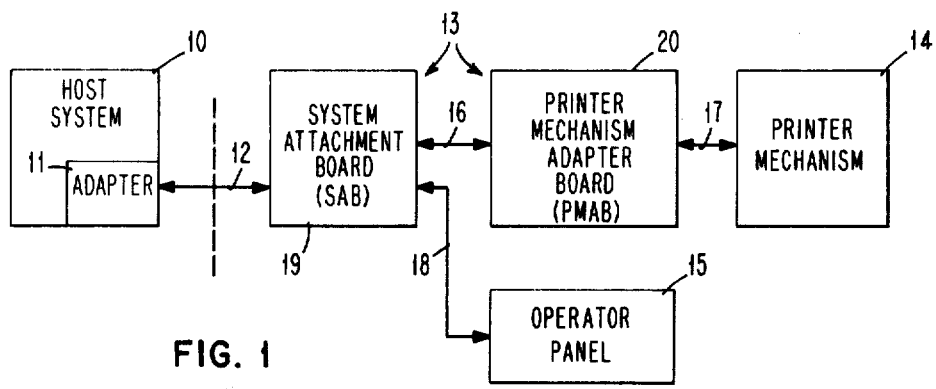
FIG. 1 is a simplified diagram of a printer system.

The printer system of FIG. 1 consists of three basic components, namely: interface 12 to a host system 10 via adapter 11, printer hardware, and printer microcode.

Interface 12 is a coaxial cable of any well-known type capable of transferring information in two directions in a 12-bit serial format. The information transmitted may have control and data bytes intermixed relative to various commands and data to be printed.

The printer hardware comprises printer control 13 printer mechanism 14 and an operator panel 15 interconnected through channels 16, 17 and 18 as shown.

Printer Mechanism

Figure 2:
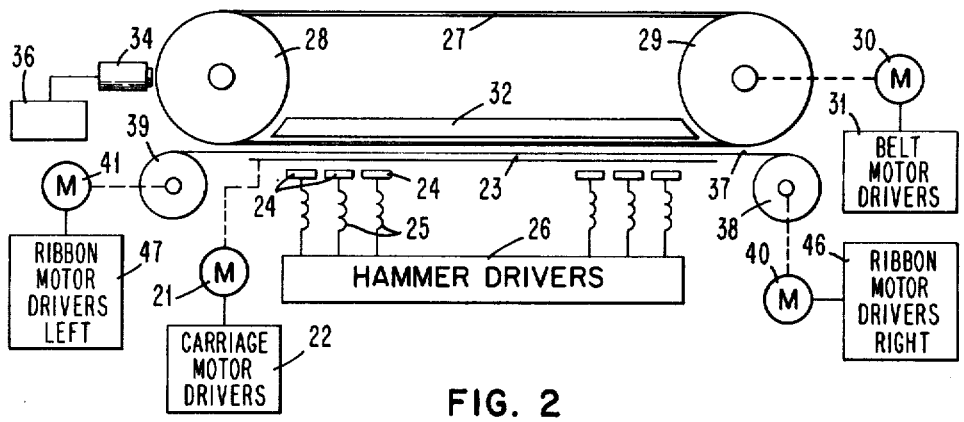
FIG. 2 is a schematic diagram showing the basic elements of the belt printer mechanism and some control elements for its operation.
Figure 3:
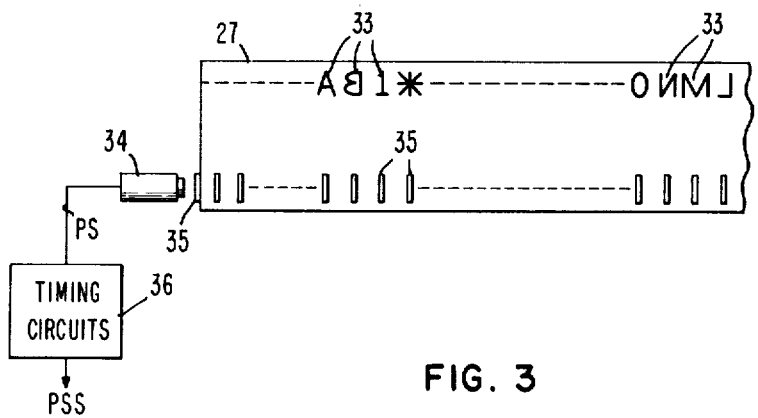
FIG. 3 shows a portion of the type belt structure used in the printer mechanism of FIG. 2.

Printer mechanism 14 comprises the mechanical assemblies to print lines of information on a print medium which may be a continuous paper form. As seen in FIGS. 2 and 3, printer mechanism 14 contains the following.

Carriage Unit. This includes stepper motor 21 operable through carriage motor drivers 22 of the printer control for advancing paper forms 23 through tractor devices (not shown) in line space increments.

Hammer Unit. This comprises print hammers 24 having electromagnetic actuators which include coils 25. The hammer unit contains 132 print hammers 24, one for each print position of the print line. The print hammers 24 are individually and selectively operated through hammer drivers 26 of the printer control.

Print Unit. A continuous type belt 27 is wrapped around pulleys 28 and 29. An AC synchronous motor 30 is connected to pulley 29 and is operated through belt motor drivers 31 of the printer controls to cause the type belt 27 to revolve at a constant speed. A platen 32 is located behind type belt 27 in the region of the print line. Type belt 27 as seen in FIG. 3 has type elements 33 comprised of the characters to be printed on paper 23. Type belt 27 rotates when driven so that each type element passes in alignment with each print hammer 24. A transducer 34 during belt rotation detects timing marks 35 and with timing circuits 36 generate print scan PS and print subscan PSS timing pulses for timing various printer control operations. Timing marks 35 are arranged to produce one PS pulse for each character on the type belt. A home pulse is generated once each complete revolution in synchronization with the actual or prospective alignment of a first type element belt position at the first print hammer print position. The home pulse is used as an index to determine a reference position on the type belt 27.

Type belt 27 is preferably a one-piece metal band. Type elements 33 and timing marks 34 may be formed by etching. Type belt 27 is removable from pulleys 28 and 29 to permit replacement in case of wear and to allow interchangeability of various type belts having different sets of characters. Alternatively type belt 27, pulleys 28 and 29 and platen 32 can be parts of an integral cartridge assembly which is replaceable as a unit.

An ink ribbon 37 is used to transfer characters from belt 27 to paper 23 on impact from the print hammers 24. Ribbon 37 extends between right and left ribbon spools 38 and 39 driven by right and left stepper motors 40 and 41 through ribbon motor drivers 46 & 47 of the printer control. The ribbon drive winds the ribbon 37 onto the spools 38 or 39 until the end of the ribbon spool is reached whereupon left or right reversing switches (not shown) are actuated causing ribbon drivers 46 & 47 to operate the stepper motors 40 and 41 in the reverse direction.

The printer mechanism 14 may also include other operating elements such as an end-of-forms switch which provides a signal to the printer control when the end-of-forms 23 is detected, a paper clamp which holds the paper stationary during printing and releases when activated to allow paper motion, and thermal switches which signal when the electromagnets of hammer 24 become overheated.

Other operative features of the printer mechanism are as follows:

Type elements 33 and print hammers 24 have different pitches.

Figures 4, 5:
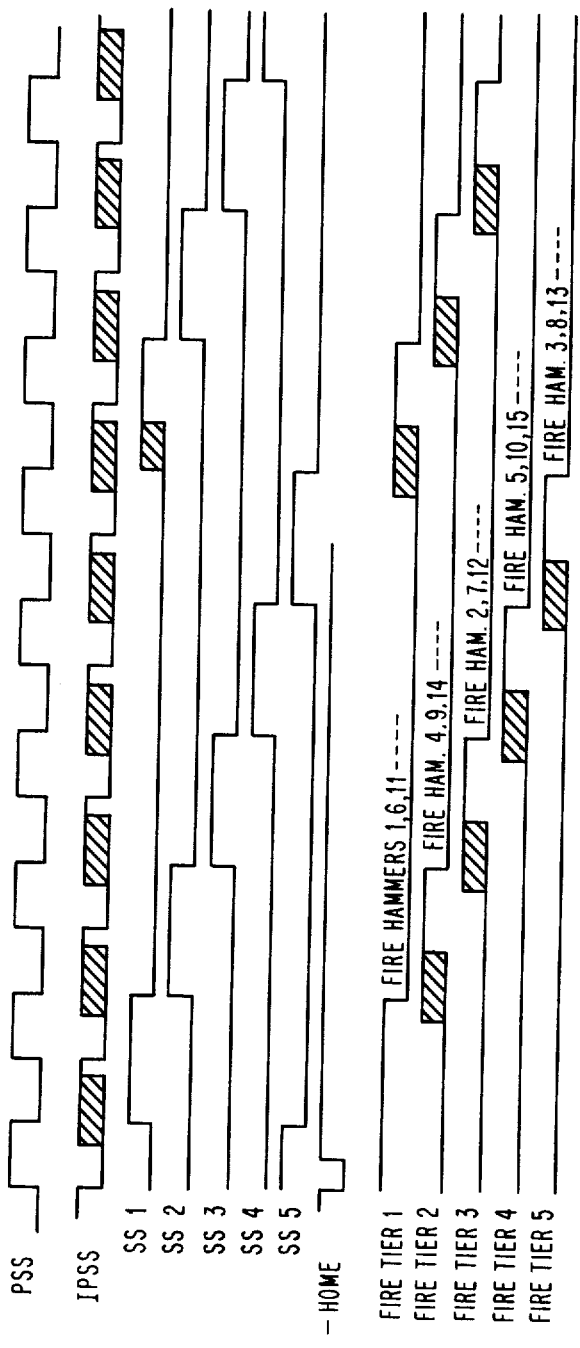
FIG. 4 shows the alignments of characters and print positions for a print scan having five subscans.
FIG. 5 is a timing diagram showing subscan and other control pulses generated during the motion of the type belt of FIG. 2.

FIG. 4 shows the specific printing sequences occurring when there are five subscans per scan period. In the printing sequences shown every fifth print position lines with every third type element (characters with circles).

A print scan is the time interval between the alignment of two successive type elements 33 at a print position. This is called a scan period. During one print scan period, all print positions will have optioned to a single character.

During a subscan, the maximum number of print hammers 24 optioned and available to be fired for a 132 print position print line is twenty-seven. Normally a maximum of six hammers can be fired during any subscan because of peak current considerations. During one scan period, all print hammers 24 have had the option of firing. Actual firing depends on the alignment of desired characters at an optioned hammer. Optioning of hammers 24 is done one subscan ahead of actual firing.

Belt position of the type elements 33 and print positions of hammer 24 are definable in terms of subscans. There are 1,440 subscans during one revolution of the type belt 27 having a type set of 288 type elements 33.

The type set for belt 27 can have various characters and various arrangements with some characters occurring once in the complete set and others occurring at various frequencies. A belt image is a coded representation of the character of each type element on the type belt and its belt position is specified in the number of subscans it is displaced from a reference or first belt position. A convenient reference belt position is the character position which aligns with the first print position at the home pulse time. All type element belt positions are a designated number of subscans from the reference position.

Operator panel. This contains push buttons for other types of switches used for instituting or terminating normal and diagnostic operations. There also are indicators available to provide a display relay to the status and diagnostics of the printer system.

Printer Control—General Description

Printer control basically consists of a system attachment board SAB 19 and a print mechanism adapter board PMAB 20. SAB 19 contains the microprocessors and storage for receiving and storing print and control information from the host system 10, for converting the print information into the format needed for printing and storing the converted print information along with control information for performing the printing and non-printing operations of the printing mechanism and for control of operator panel 15. SAB 19 also contains the timing for the microprocessors along with the busses and attachment hardware for connection to the host system and to the PMAB 20 and operator panel 15. PMAB 20 contains the logic and timing circuitry used to control the electrical and mechanical operations of the printer mechanism 14 in accordance with control data received from SAB 19. PMAB 20 also contains circuitry for receiving feedback signals useful for indicating the condition and status of the printer mechanism to the microprocessors on SAB 19. PMAB 20 further contains the means for synchronizing the signals and data from SAB 19.

Printer Control—System Attachment Board SAB 19

Figure 6:
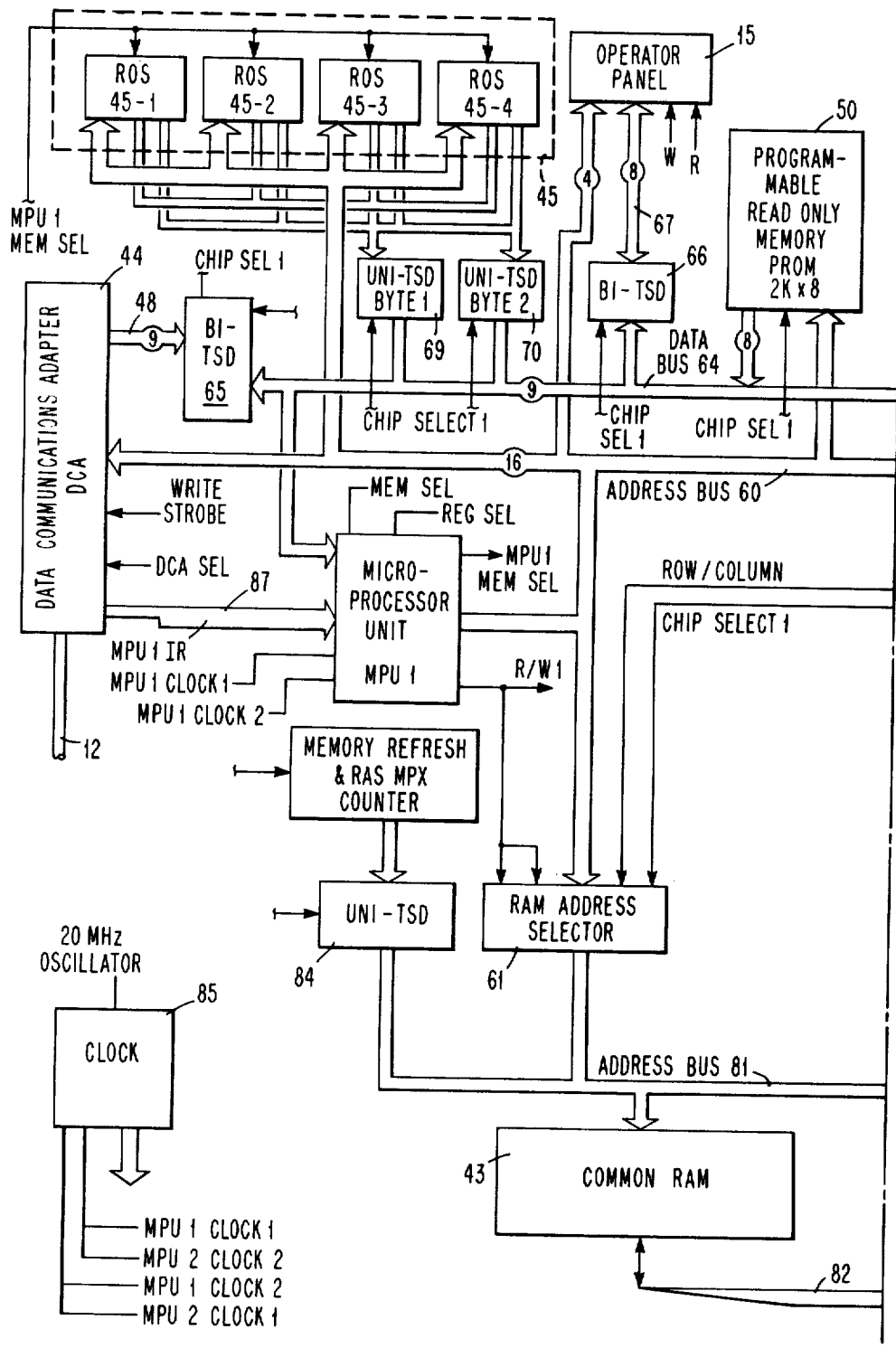
FIG. 6 & 7 together show a detail diagram of the system attachment board portion of FIG. 1.
Figure 7:
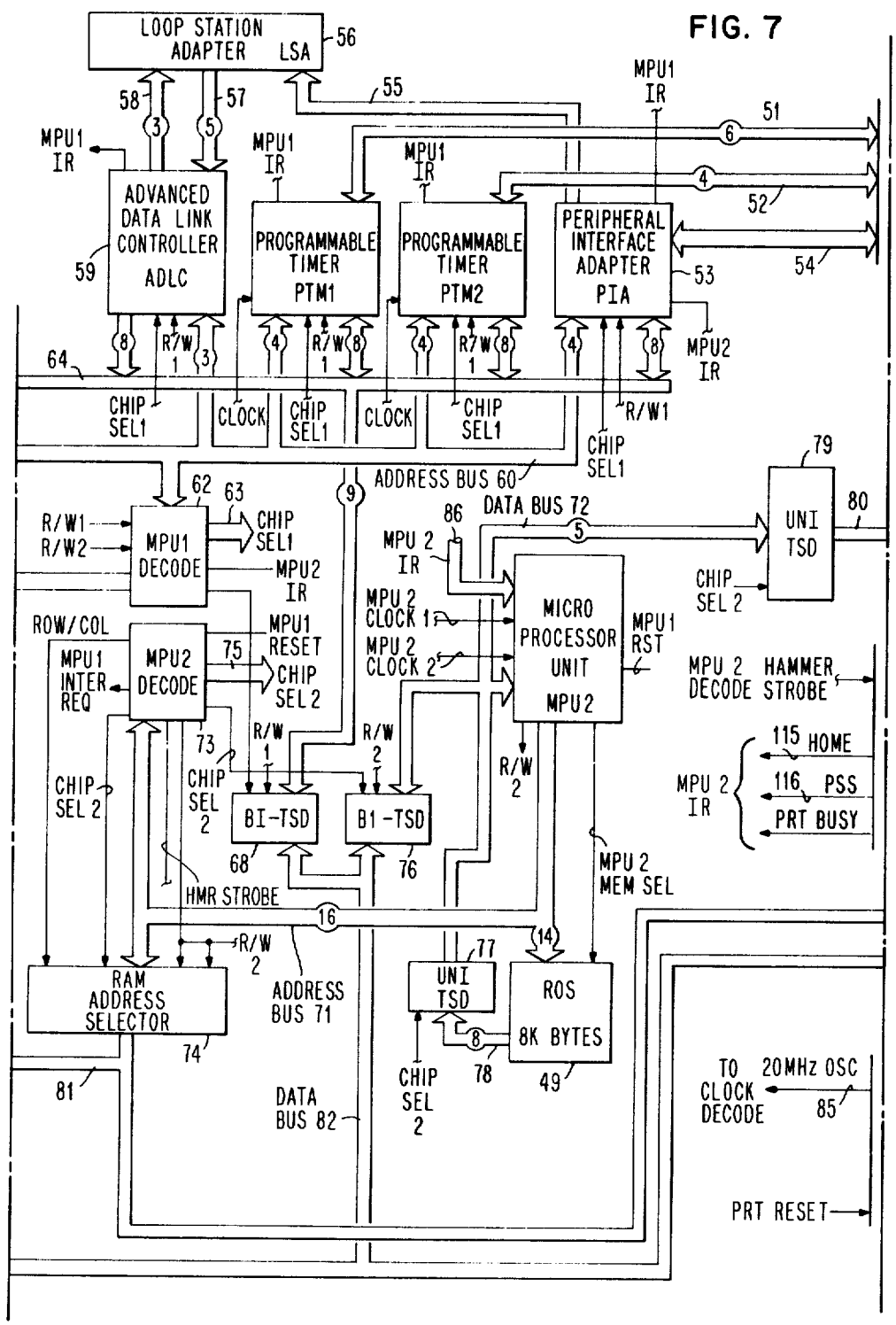
Figure 9:
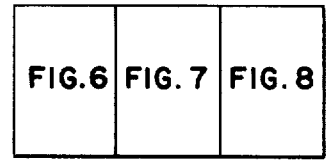
FIG. 9 is a block diagram showing the combination of FIGS. 6, 7 and 8 which together form the printer control portion of FIG. 1.

SAB 19, as seen in FIGS. 6 and 7 in the combination as shown in FIG. 9, contains two microprocessors MPU 1 and MPU 2 along with a common RAM 43. MPU 1 and MPU 2 together control the entire function of the printer mechanism 14 and operator panel 15. Basically MPU 1 performs the functions of communicating with the host system via a Data Communications Adapter DCA 44 and interface 12 for the reception of the printing and control information relating to the operation of printer mechanism 14 and panel 15. MPU 1 preprocesses the print information and stores it in the common RAM 43 for further processing by MPU 2. MPU 1 also receives and stores in the common RAM 43 the control information useful for controlling both printing and nonprinting operations. MPU 1 controls certain nonprinting operations of the printer mechanism along with controlling the operation of the operator panel 15. All microprograms of MPU 1 operation are contained in a 32 K byte Read Only Storage ROS 45 which takes the form of ROS modules 45-1, 45-2, 45-3 and 45-4 each having 8 K×9 bytes storage capacity.

MPU 2 processes the preprocessed print information stored in the common RAM 43 by MPU 1 into a printing algorithm required for the operation of the printer mechanism and stores it in RAM 43 for use to control the operation of print hammers 24 of the hammer unit. The programs for operating MPU 2 are stored in a Read Only Storage ROS 49.

Belt images used by MPU 2 for processing the printing algorithm are stored in a Programmable Read-Only Memory PROM 50 having a storage capacity of 2 K×8 bytes. Plural belt images may be programmed into PROM 50 prior to shipment to correspond with plural type belts designed for the system application. Alternatively, PROM 50 may be a field replaceable unit (FRU) and may be programmed and interchanged when various type belts are supplied for replacement in the print mechanism. Another alternative is to have host system 10 provide the belt images for various print lines being communicated to SAB 19 along with the print information in which event the belt image is stored by MPU 1 in common RAM 43.

SAB 19 also contains Programmable Timers PTM 1 and PTM 2. PTM 1 is controlled by MPU 1 and provides control signals on bus 51 to the motor drive of the carriage unit for indexing the print medium. PTM 2 is controlled by MPU 1 to communicate control signals via bus 52 to motor drivers for the ink ribbon.

A further control element of SAB 19 comprises Peripheral Interface Adapter PIA 53 which is controlled by MPU 1 to provide various control signals to the carriage & ribbon drivers, type belt motor drive, as well as interrupts from MPU 1 to MPU 2. Should the printer system be designed for connection to a loop of a communication network, PIA 53 would have a bus 55 connected to a Loop Station Adapter LSA 56 which communicates on busses 57 and 58 with an Advanced Data Link Controller ADLC 59 which is also controlled by MPU 1.

SAB 19 also contains dedicated bus structures which connect microprocessors MPU 1 and MPU 2 to their respective control and operating elements. The Address Bus 60 is a dedicated 16-bit address bus connecting MPU 1 to DCA 44, ROS 45, operator panel 15, PROM 50, ADLC 59, PTM 1, PTM 2 and PIA 53. Address bus 60 is also connected to an Address Selector 61 which is connected to the common Address Bus 81 for addressing common RAM 43. Address Bus 60 provides a further connection of MPU 1 to the MPU 1 Decode 62 which has CHIP SEL 1 lines 63 leading to the various MPU 1 controlled devices and elements as shown. The arabic numerals within the various branches of the address bus 60 as well as other busses represent the number of lines connected to the various control and operating elements controlled by the MPU 1 and MPU 2 microprocessors.

The Data Channel for MPU 1 on SAB 19 is a dedicated 9-bit data bus 64 which has direct bidirectional connections with PTM 1, PTM 2 and PIA 53; a bidirectional connection via bidirectional Tri-State Device BI-TSD 65 to the Data Communication Adapter DCA 44; a bidirectional connection via bidirectional Tri-State Device BI-TSD 66 and Bus 67 to the operator panel 15; and a bidirectional connection with the bidirectional Tri-State Device 68; and unidirectional connections via the unidirectional Tri-State Devices UNI-TSD 69 and 70 to the ROS 45.

The dedicated bus structure on SAB 19 for MPU 2 comprises a 16-bit Address Bus 71 and a 9-bit Data Bus 72. Address Bus 71 connects MPU 2 to ROS 49 and MPU 2 Decode 73 and Address Selector 74. MPU Decode 73 has CHIP SEL 2 output lines 75 for applying CHIP SEL 2 signals to various operating elements controlled by MPU 2. Data Bus 72 is connected to a bidirectional Tri-State Device BI-TSD 76, a unidirectional Tri-State Device UNI-TSD 77 for receiving data from ROS 49 on bus 78 and a unidirectional Tri-State Device UNI-TSD 79 for sending print hammer fire control signals on Hammer Bus 80 to PMAB 20.

The common bus architecture on SAB 19 comprises a 7-bit row/column Address Bus 81 and a 9-bit Data Bus 82. Address Bus 81 connects the MPU control Address Selectors 61 and 74 to the 6 K byte dynamic common RAM 43. This is done by multiplexing 14 MPU address lines into 7 row & 7 column addresses for RAM. Address Bus 81 also connects a Memory Refresh and RAS & MPX counter 83 via a unidirectional Tri-State Device UNI-TSD 84. The common Data Bus 82 is connected between BI-TSD 68 and BI-TSD 76 whereby print and control data are stored in and retrieved from the common RAM 43 for use by both MPU 1 and MPU 2. SAB 19 also contains a Clock Decode 85 which receives timing pulses from an oscillator on PMAB 20 and provides all the timing and Clock Pulses to the microprocessors and other devices for various printing and non-printing operations including MPU 1 & MPU 2 CLOCK 1 & CLOCK 2.

SAB 19 further contains interrupt lines 86 connected to MPU 2 for receiving interrupt requests MPU 2 IR, interrupt lines 87 connected to MPU 1 for receiving interrupt requests MPU 1 IR, and various lines for communicating CLOCK, R/W, Strobe, select and feedback signals from SAB 19 & PMAB 20 operating elements.

Printer Control-Printer Mechanism Adapter Board PMAB 20

Figure 8:
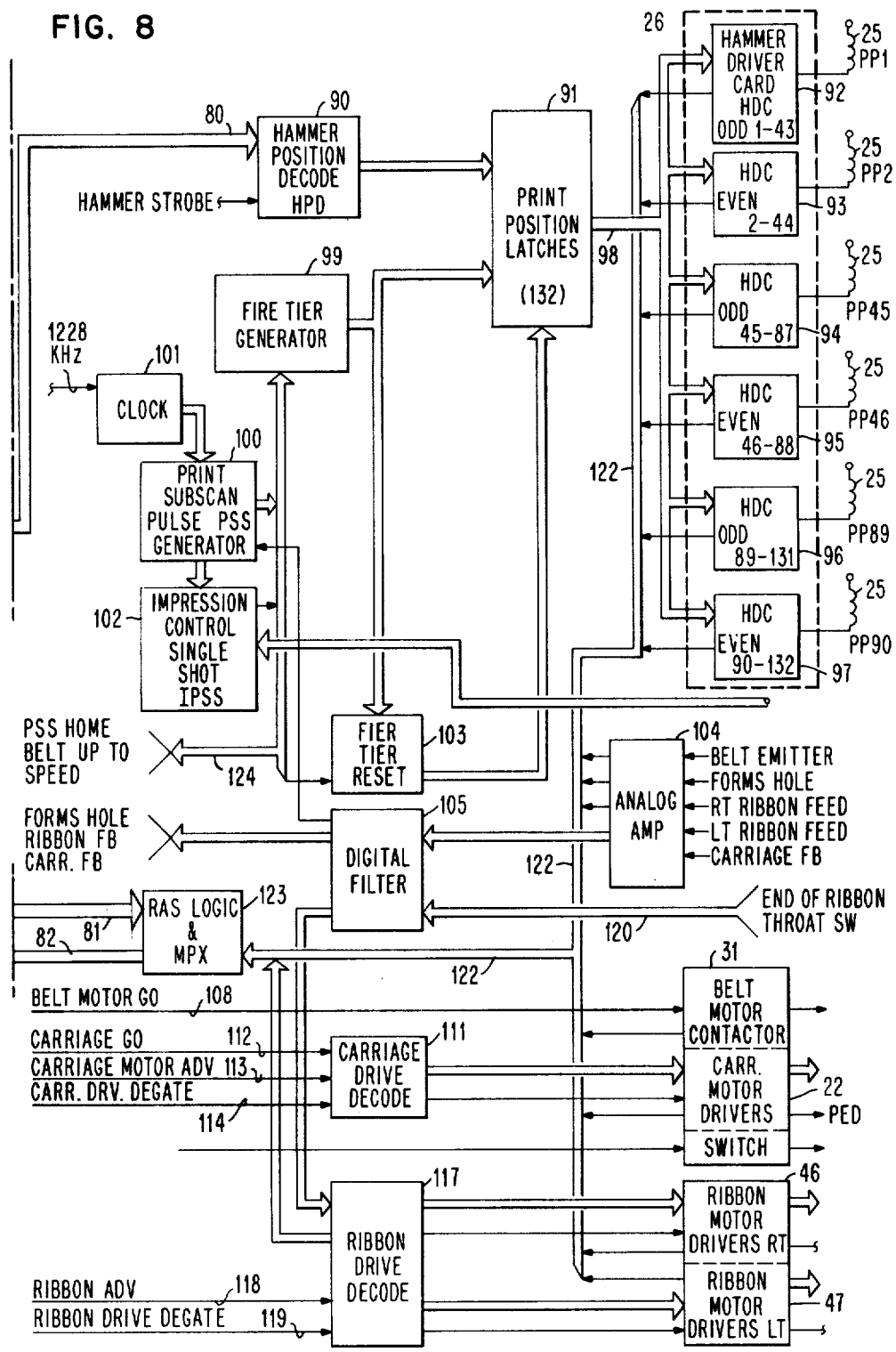
FIG. 8 is a detailed diagram of the printer mechanism adapter board portion of FIG. 1.

PMAB 20 is shown in FIG. 8. Its combination with SAB 19 is shown in FIG. 9.

PMAB 20 comprises a Hammer Position Decode HPD 90 which decodes print position fire data received on hammer bus 80. Print Position Latches PPL 91 are set by the decoded signals from HPD 90 for gating fire tier pulses onto bus 98 to a set of Hammer Driver Cards HDC 92-97 of the hammer drivers 26. The Hammer Driver Cards HDC 92-97 contain twenty-two driver circuits each connected to energize twenty-two ODD or EVEN coils 25 of the electromagnets for operating the print hammers 24 (see FIG. 2). Fire Tier pulses, as shown in FIG. 5, are supplied to PPL 91 by Fire Tier Generator 99. The fire tier pulses are timed by print subscan SS pulses, SS 1-SS 5 (see FIG. 5) from a Print Subscan Pulse (PSS) Generator 100 under control of a Clock 101 driven by a free-running oscillator. Impression Control Single Shot ICSS 102 modifies the duration of the fire tier pulses as shown in FIG. 5 in response to a signal from a Forms Thickness Switch. Fire Tier Reset 103 is a trigger operated by Print Subscan PSS pulses and Fire Tier Pulses to generate reset pulses timed to reset the latches of PPL 91 at the end of each subscan. Belt Emitter Pulses from transducer 34 & timing circuit 36 (see FIG. 3) to Analog Amplifier 104 and Digital Filter 105 are applied to PSS generator 100 to synchronize the PSS and fire tier pulse generation with type belt motion.

Other control elements contained on PMAB 20 include Belt Motor Contactor 31 operated by a BELT MOTOR GO signal on line 108 of bus 54 from PIA 53 of SAB 19 (see FIG. 7).

Carriage Motor Drivers 22 receive drive signals from Carriage Drive Decode 111 which receives CARRIAGE GO MOTOR ADV and DRV DEGATE commands on lines 112-114 of bus 54 from PIA 53 of SAB 19 (see FIG. 7).

Ribbon Motor Drivers Right 46 and Ribbon Motor Drivers Left 47 receive drive signals from Ribbon Drive Decode 117 in response to RIBBON ADV and RIBBON ADV DEGATE signals on lines 118 and 119 from bus 54 of PIA 53 of SAB 19 (see FIG. 7). Ribbon Drive Decode 117 supplies direction signals to the Ribbon Motor Drivers 46 and 47 in response to Ribbon SW signals from Digital Filter 105 which are received on bus 120 from End Of Ribbon (EOR) switches located on the printer mechanism 114. A Ribbon REV signal is sent on line 121 of bus 54 of SAB 19 by Ribbon Drive Decode 117.

PMAB 20 also contains bus 122 connected to RAS Logic and Multiplexor 123 for receiving diagnostic signals and for supplying status and feedback signals from the various operating circuits as well as on external feedback signals to SAB 19. Bus 124 provides PSS and HOME pulses and a BELT UP TO SPEED signal from the PSS generator 100 to MPU 1 and MPU 2 of SAB 19. Clock 101 & PSS Generator 100 correspond to Timing Circuits 36 in FIGS. 2 & 3.

Printer Control-Printer Microcode

The printer microcode controls the operation of the printer functions and the operator panel. It is also used to store the status of the printer for testing and control of printer operations. The printer microcode comprises two code modules which interact with each other. The modules are the printer common microcode PCM and the printer adapter code PAC. The PCM resides in ROS 45 and is used to control transfer of control and printing information between the host system and the printer. PCM also moves format, control, and print information into mapped areas of RAM 43 to be processed by PAC. PCM also accepts status from PAC. PAC interprets the control and printing information to cause a line of information to be printed and then to move the forms to the next line. PAC also assembles and returns status of the operations to the PCM. PAC is resident in ROS 45 and ROS device 49 depending on which microprocessor is being used to perform the various functions.

Printer Control-Common RAM 43

Common RAM 43 is a 16K byte refreshable dynamic memory which stores the print algorithm tables, the print line buffers, motor tables and the common microprocessor sense and hand shaking controls which are a part of the printer microcode. The common address and data busses 81 and 82 are memory mapped into both microprocessors MPU 1 and MPU 2 and are accessed by these microprocessors on alternate half cycles using MPU 1 and MPU 2 CLOCK 1 and 2 pulses from the Clock Decode 85 (see FIG. 6).

Figure 10:
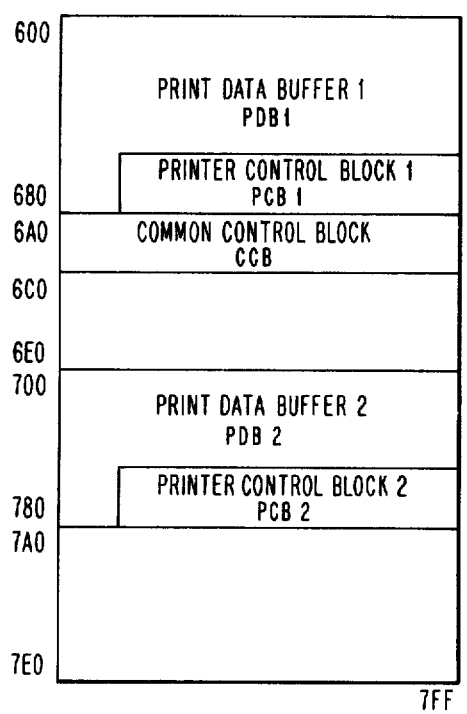
FIG. 10 is a memory map showing the print data buffer regions of the RAM storage of FIG. 6.

In the printer control system the printing information comprises two or more lines of data which may be stored and processed concurrently. Specifically, while one line of data is being printed another one is being converted to the printing algorithm for printing and possibly a third line is being stored in RAM 43. FIG. 10 shows memory maps of RAM 43 for storing two lines of print information along with control information used to pass the print line information to MPU 2 for further processing. As seen in FIG. 10 the Print Data Buffer PDB 1 field contains print information for a line of data. The Printer Control Block PCB 1 field contains the control information relating to the handling of the print information in PDB 1 including line feeding and line density information, i.e. 6 or 8 lines per inch. PCB 1 also contains a status field to record the results of the transaction relating to PCB 1.

PCB 1 field contains multiple bytes which might include the following types of control information.

1. Address of the next PCB which is to be serviced after processing of the current PCB is complete.
2. The address of the PDB associated with this PCB
3. General control information to convey to PAC what class of action is desired. For example, test for new chain image, horizontal motion, vertical motion.
4. New belt image flag set from the host system to indicate that a new belt image is required for the printing of print information to be transmitted to the printer system.
5. Left and right column control information which indicates the leftmost printable character in the print buffer and the rightmost printable character in the print buffer.
6. Line density information which indicates whether forms feeding should occur at 6 or 8 lines per inch.

The Common Control Block CCB field in the memory map of FIG. 10 contains control information used to control the processing sequence of the PCB's by PCM and PAC. CCB may also include information which defines required printer attributes and microcode flags and addresses. Among the types of control information in the CCB field are 1. The address of the next PCB available for use by PCM.
2. The address of the next PCB which is to be serviced by PAC.
3. The pointer to the start of the printer's belt image buffer.
4. The address plus one of the last byte of the belt image buffer.

As seen in FIG. 10 Print Data Buffer PDB 2 in the map of the RAM 43 is the storage region for the print information of a second line of data. The Print Control Block PCB field 2 contains essentially the same control information as in the PCB 1 field as it relates to the contents of the print information in PDB 2.

PDB 1 and PDB 2 are constructed by MPU 1 from print and data information received from the host system through either DCA 44 or ADLC 59 (see FIGS. 6 & 7) in accordance with PCM and PAC microcode.

Additional Print Data Buffers may also be included in RAM 43. If included the memory map would be substantially as shown for PDB 2 and its associated PCB 2 field. In the event a third PDB is used it is possible for a printer control system to be operated where a first print line is being printed a second one is being stored in one of the PDBs and a third one already stored in a PDB is being processed to the format necessary for printing following the printing of the first line of information.

Figure 12:
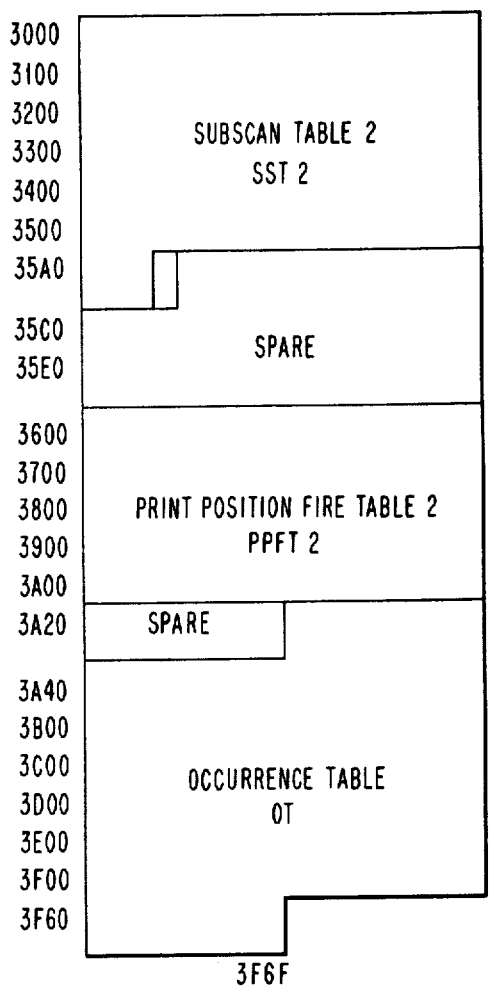

FIGS. 11 and 12 show the memory maps of storage areas in RAM 43 which contain the print algorithm tables constructed for use by the MPU 2.

The Belt Image Table BIT in FIG. 11 contains the character information representing belt characters on the type belts arranged in the order in which the characters occur on the belt beginning at the first belt address location with the character at the reference belt position. As previously indicated this reference character could be the character aligned with print position 1 when the home pulse is generated. BIT is built by MPU 1 from one of the belt images stored in PROM 50 on instruction from the host system or alternatively may be communicated by the host system through either DCA 44 or ADLC 59. BIT is generally constructed as part of and during the start up procedure for the printer system or when a belt 27 is replaced with a belt having a new type set.

The Belt Image Address Table BIAT field contains the coded data representing each unique character on the type belt and an indirect address location in the Occurrence Table. BIAT (FIG. 11) and the Occurrence Table OT (FIG. 12) are constructed concurrently by MPU2 in accordance with microprograms stored in ROS 49. BIAT contains character information representing each unique character on the type belt 27 and address information for each unique character where it can be located in OT.

The Occurrence Table OT contains the coded data indicating the Occurrence Count OC of each unique character on the type belt 27 at the OT address contained in BIAT. OT also contains location information indicating the type belt locations for each actual occurrence plus one redundant location of the related character. The redundant location always follows the last actual occurrence location. The location information in coded form is numerical value corresponding to the number of subscans each character occurrence is from the reference character location of the type belt. The location information for the redundant location is a numerical value representing the number of subscans for the first actual character occurrence plus the number of subscans in one complete revolution of the belt. Thus the redundant location information essentially repeats the first actual occurrence of the character.

The illustration of part of the structure of an occurrence table is seen in FIGS. 15A, B and C. As seen in those figures the table for the symbol ¢ at memory address location 3A30–32 shows two actual occurrences (0002) having belt locations in hex code consisting of 00CD and 039D plus the redundant location 066D. The table for the symbol . (period), memory address location 3A38–39 contains the occurrence code (007) representing seven occurrences and the hex code locations (in subscans) 008C, 0159, 0226, etc. plus the last redundant location 062C. 062C represents 1440 subscans plus the number of subscans represented by the first actual belt location 008C where 1440 subscans corresponds with the interval for one revolution of the type belt having 288 characters and a type element/hammer pitch relation which produces five subscans per scan period. The tables for other characters are similarly shown.

Other print algorithm tables constructed by MPU 2 and used by MPU 2 for printing lines of data stored in PDB 1 and 2 consist of two Subscan Tables SST 1 and 2 and two Print Position Fire Tables PPFT 1 and 2 associated therewith. Subscan Table SST 1 (FIG. 11) stores in subscan order indirect address information identifying the storage location in PPFT 1. PpFT 1 contains print position fire data of the corresponding subscan indirect addresses which represent the print positions to be fired in the related subscan identified by SST 1. PPFT 1 also contains count information indicating the number of print positions to be fired in the subscan. The operations by MPU 2 for building of SST 1 and PPFT 1 by MPU 2 can be understood in more detail by reference to the related copending application of Bolcavage et al filed concurrently herewith.

The following tables illustrate part of related SST & PPFT tables.

| Subscan Table SST | | | |
|---|---|---|---|
| Memory Address (HEX) | Subscan (DECIMAL) | PPFT Indirect Address (HEX) | PPFT Address (HEX) |
| 3000 | 0000 | FF | |
| 3000–343F | 0001–1087 | FF | |
| 3440 | 1088 | 6D | 3968 |
| 3441 | 1089 | FF | |
| 3442 | 1090 | 28 | 3740 |
| 3448 | 1096 | FF | |
| 3449 | 1097 | 47 | 3838 |
| 344A | 1098 | 63 | 3918 |
| 344B | 1099 | FF | |
| 344C | 1100 | 46 | 3830 |
| 344D | 1101 | FF | |
| 344E | 1102 | FF | |
| 344F | 1103 | 45 | 3828 |
| 3474 | 1137 | 00 | 3600 |
| 3475 | 1138 | 6C | |
| 3476 | 1139 | 5B | |
| 3477 | 1140 | FF | |

| PRINT POSITION FIRE TABLE PPFT | | |
|---|---|---|
| Memory Address (HEX) | No. of Print Positions | Print Position(s) HEX |
| 3600–02 | 01 | 00 |
| 36D–DA | 01 | 5B |
| 3740–42 | 01 | 28 |
| 3750–53 | 02 | 2A 61 |
| 3778–7C | 03 | 2F,5C,6B |
| 3790–94 | 03 | 32, 3C 73 |
| 3828–2A | 01 | 45 |
| 3830–32 | 01 | 46 |
| 3838–3A | 01 | 47 |
| 3918–1A | 01 | 43 |
| 3960–62 | 01 | 6C |
| 3968–6A | 01 | 6D |
| 3970–72 | 01 | 6G |
| 3978–7A | 01 | 6F |
| 3980–82 | 01 | 70 |
| 3988–8A | 01 | 71 |
| 3990–92 | 01 | 72 |
| 3998–99 | 01 | 73 |
| 39A0–A2 | 01 | 74 |
| 39A8–AA | 01 | 75 |
| 39B0–B2 | 01 | 76 |
| 39B8–BA | 01 | 77 |
| 39C0–C2 | 01 | 78 |

FIG. 12 shows a map of the storage area of RAM 43 for the Subscan Table SST 2 and associated Print Position Fire Table PPFT 2 which are constructed alternately with SST 1 by MPU 2 for printing a second line of print information print in the PDB 2 field. If a third PDB 3 (not shown) were used, SST1/PPFT 1 or SST2/PPFT2 where free would be used for constructing the print algorithm for the contents of PDB3.

The Table Control Block TCB field (FIG. 11) contains control information generated and used by MPU 2 to control the usage of the two SST's and PPFT's. TCB contains control information which would include the following:

1. $SE_{MAX}$
2. START SUBSCAN-$S_I$
3. Count.

$SE_{MAX}$ is the number of the last subscan of printing for the preceding line of information $SE_{MAX}$ is calculated by MPU 2 during building of SST 1 or SST 2 and stored in RAM 43. PCB contains information directing operations of MPU 2 for calculating $SE_{MAX}$.

$S_I$ is the value calculated by MPU 2 identifying the SST subscan location where printing begins for the lines of data in SST 1 and SST 2. $S_I$ is calculated in accordance with the expression $S_I = T + SE_{MAX}$. T is the quantity calculated by MPU 2 in subscans representing the time interval for moving the forms in the equivalent subscans based on control information stored in printer control blocks PCB 1 and PCB 2. (see FIG. 10).

The Count field of TCB contains information indicating the availablity status of SST 1 and SST 2. The Count field information indicates whether either or both SST's are available for construction of a print line. For example: 04 in the Count field would indicate both SST's are available; 00 would indicate that neither SST is available 02 would indicate one SST is available.

Figure 14:
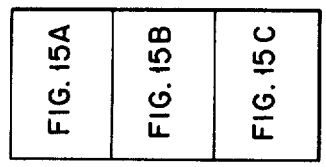
FIG. 14 shows the arrangement for combining FIGS. 15A, 15B and 15C.

The common RAM 43 contains certain mapped registers for I/O control purposes. FIG. 14 shows a register map for one area having a Mechanical Control Block MCB, CARRIAGE, and RIBBON fields used by MPU 1 and MPU 2 for various and indicated function. The MCB field contains the control information to pass control and status information by PCM and PAC between MPU 1 and MPU 2 The information relating to print hammer operation is stored in the MCB field. Other operations included in the MCB field are various bytes of information which contain the following indicated conditions.

1. PCB's are available (e.g. PCB 1 and PCB 2 in FIG. 10) and the last PCB in a chain to be processed.
2. A new belt image is available in BIT.
3. The address of the print data associated with the available PCB identified in 1.
4. Leftmost and rightmost characters can be printed in a line.
5. Line feed i.e. the number of spaces to move the forms. This information is used by MPU 2 for computing the value T in the equation $S_I = T + SE_{MAX}$.
6. Line density i.e. number of lines per inch to be used for forms movement.
7. Status relating to various operations in the printer mechanism and control including carriage unit print hammers, type belt, sync check (home pulse occurrence and hammer parity.

In general there are no interrupts associated with the MCB bytes. Normal operation calls for the MPU 2 to constantly test these bytes for a non zero condition. Bits are set by the MPU 1 portion of PAC and reset by the MPU 2.

Figure 13:
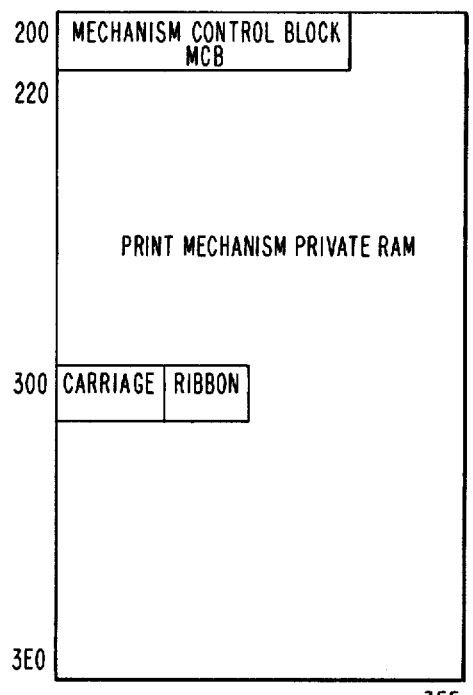

The CARRIAGE field of the I/O register map in FIG. 13 contains the tables used by MPU 1 to operate the Programmable Timer PTM 1 (FIG. 7). These tables may be provided by the host system and are constructed as part of the start up procedures by MPU 1 under control of PCM. The tables contains control information for acceleration, deceleration, and line spacing operations of the carriage drive motor 21 (see FIG. 2) in accordance with control information in PCB 1 & PCB 2, etc.

The RIBBON field portion of the I/O register map of FIG. 13 contains the tables used by MPU 1 to control the programmable timer PTM 2 (see FIG. 7) for operating the ribbon motor drivers 46 & 47 (see FIGS. 2 & 8) through the ribbon drive decode 117 (see FIG. 8).

RAM 43 also has registers (not shown) which are used for storing constants used by MPU 2 for performing various calculations in building tables for the print algorithm. Two such registers are the REV COUNT and COUNT MAX registers. The REV COUNT registers store the value 1440 which represents the number of subscans in one revolution of type belt 27. The COUNT MAX register stores the value six representing the maximum number of print hammers which can be fired in a subscan.

Printer Control-Interrupts

MPU 1 and MPU 2 work on a system of priority interrupts having multiple levels. The following tables show the assignment of interrupt levels for MPU 1 interrupt requests.

MPU 1 Interrupt Levels

0-Operator Panel and MCPC (machine check program check)
1-system attachment.
2-forms movement
3-timers or ribbon
4-MPU 2 or MPU 1 communication
5-alarm or POR
6-software timer
7-SNA/SCS processing The following table shows the interrupt levels for MPU 2 interrupt requests.

MPU 2 Interrupt Level

0-MCPC (machine check program check)
1-PSS; Print mode
2-PSS; Nonprint mode
3-HOME
4-MPU 2 to MPU 1 communication
5-Sync check or missing HOME pulse
6-PRINTER BUSY
7-Print line calculation MPU 1 level 3 interrupt primarily functions to handling interrupts of the timers PTM 1 and PTM 2. The timer section devoted to the motor controls is isolated from the rest of level 3 interrupt handling. Only the general-purpose timer interacts with the data handling portion of level 3. The general purpose timer causes interrupts to occur at regular intervals. These interrupts cause an escape from a printer idle state when data becomes available. These interrupts also turn off the ribbon and/or the belt motors when more than a specified time elapses between printing lines.

The software interrupt portion of MPU 1 level 3 takes available PCB's and provides them to the MPU 2. Special PCB bytes are checked for deviations from normal data flow.

MPU 1 level 4 interrupts have the primary function of communication between MPU 2 microcode and the MPU 1 interrupt handlers for levels 2, 3 and 7. After receiving status from MPU 2, level 4 vectors to level 3 to request interrogation of the work queue in the CCB, then level 2 to request forms move, and level 7 to request error handling. Level 4 also logs errors. The MPU 1 level 4 interrupt handler is entered by either hardware interrupts from MPU 2 or software interrupts from MPU 1.

The cause of a hardware interrupt from MPU 2 is determined by reading MCB bytes. Four causes of interrupts from MPU 2 are: PCB processing completed, completion of the printing of a line, detecting home when the last PCB in a chain is completed and the printer has completed printing the current line, and printer busy. Software interrupts to level 4 may be due to an interrupt from either level 2 or 3. Level 2 interrupts level 4 each time a forms move is completed. Level 2 also interrupts level 4 when an error occurs.

Printer System-Operation

Operation begins with the performance of a series of Start Up routines initiated by Power On or Power On Reset signals from Operator Panel 15 to MPU 1. During Start Up MPU 1 and MPU 2 check all registers, buffers and tables of RAM 43 PTM 1, PTM 2 and PIA 53 as well as their own buffer registers. The checking routines culminate in the storing of zeros through all registers and memory except SST 1 and 2, PPFT 1 and 2, TCB, BIT, BIAT and OT which have FF's stored at all address locations.

During Start Up MPU 1 also reads the CARRIAGE and RIBBON tables into RAM 43 at the addresses shown in FIG. 13. MPU 1 also programs PTM 1, PTM 2 and PIA 53 to perform the control data decodes and timing operation required for carriage and ribbon control as well as for generating the MPU 1 and MPU 2 IR's as shown.

During Start Up MPU 2 stores a 1440 count and a 6 count in REV COUNT and COUNT$_{MAX}$ registers located in the free register area of RAM 43.

Various test operations may also be performed during Start Up such as operating the belt motor 30, the ribbon motors 40 and 41 and the print hammers 24 through defined operating procedures.

Preceding the beginning of printing belt motor 30 is turned on by MPU 1 placing its address on Address Bus 60 to PIA 53. MPU 1 Decode 62 decodes the PIA 53 address and raises a CHIP SEL line 63 to apply a CHIP SEL 1 signal to PIA 53. MPU 1 puts belt motor control data on Data Bus 64. A write pulse R/W1 from MPU 1 stores the control data in PIA 53 registers for a decoding operation which then applies a BELT MOTOR GO signal on line 108 of bus 54 to the BELT MOTOR CONTACTOR 31 which applies AC power to BELT MOTOR 30.

MPU 1 then puts a BELT MOTOR ON flag into the MCB of RAM 43 and generates an MPU 2 IR. The storage of the BELT MOTOR ON flag in RAM 43 is performed by MPU 1 putting the MCB address on Address Bus 60 to RAM Address Selector 61 and the flag data on Data Bus 64. MPU 1 Decode 62 decodes the RAM address and applies a CHIP SEL 1 signal to Selector 61 and TSD 68. A read/write pulse R/W1 from MPU 1 to Selector 61 and TSD 68 Gates the RAM MCB address onto Address Bus 81 and the flag data onto Data Bus 82 resulting in the storage of the flag data in the MCB region of RAM 43.

MPU 1 generates the MPU 2 IR by putting the MPU 2 address on Address Bus 60 to the MPU 1 Decode 62 which raises the MPU 2 IR line which connects with bus 86 to MPU 2.

MPU 2 upon receipt of the IR from MPU 1 during its half cycle accesses RAM 43 by placing the MCB RAM address on bus 71. MPU 2 Decode 73 decodes the RAM address and activates the CHIP SEL 2 lines to RAM Address Selector 74 and TSD 76. Read pulses R/W2 from MPU 2 to Selector 74 and TSD 76 gates the MCB address onto Address Bus 81 and reads the BELT MOTOR ON flag data onto Data Bus 82 through TSD 76 into its buffer.

In response to the BELT MOTOR ON flag, MPU 2 performs a belt sync check. This is done by MPU 2 counting PSS and HOME pulse IRs on lines 115 and 116. The PSS count is stored in the free register space in RAM 43 and is increased one count for each PSS pulse. MPU 2 resets the PSS register to zero upon receipt of the first HOME pulse. After the second HOME pulse the PSS register is checked. If the register count stands at other than 1440, MPU 2 places a SYNC CHECK flag in MCB of RAM 43 and sends an MPU 1 IR through MPU 2 Decode 73 to Bus 87. In performing the belt sync check MPU 2 accesses RAM 43 through Address Bus 71 RAM Address Selector 74 and through Data Bus 82 and TSD 76 with CHIP SEL 2 signals from MPU 2 decode 73 and read/write pulses R/W2 applied to Selector 74 and TSD 76.

In the course of the performance of the various operations, the microprocessors MPU 1, MPU 2 access their read/only storage memories for the microprogram instructions which control their operations. MPU 1 accesses ROS 45 for its microprograms by a ROS 45 address on Address Bus 60 and raising the MPU 1 MEM SEL line to ROS 45. MPU 1 decode 62 decodes the ROS 45 address and raises the CHIP SEL 1 lines 63 to TSD 69 and/or TSD 70. Read pulses R/W1 from MPU 1 read microprogram instructions from ROS 45 through TSD 69 and TSD 70 onto Data Bus 64 into input buffers of MPU 1 for processing.

MPU 2 accesses ROS 49 by placing a ROS 49 address on Address Bus 71 to ROS 49 and MPU decode 73 and raises the MPU 2 MEM SEL line to ROS 49. Decode 73 decodes the ROS 45 address and raises the CHIP SEL 2 line to TSD 77. Read pulses R/W2 read microcode instructions from ROS 49 onto bus 78 and through TSD 77 to input buffers of MPU 2 for processing.

Upon completion of the Start Up routines MPU 1 may operate in an idle routine in accordance with microinstructions from ROS 45 to monitor the Data Bus 48 and MPU 1 IR's from DCA 44 looking for print request control data. MPU 2 concurrently may operate in an idle loop routine from its ROS 49 monitoring the MCB address location of RAM 43 and interrupts from MPU 1 for instructions to begin building the various algorithm tables.

Preceding the building of the print algorithm tables by MPU 2 a belt image is transferred from PROM 50 to BIT of RAM 43. An instruction from Host System 10 identifies the desired belt image is received by MPU 1 from DCA 44 through TSD 65. In response to this instruction, MPU 1 retrieves the microprogram from ROS 45 in the manner previously described and puts the address to PROM 50 onto Address Bus 60. Each PROM address from MPU 1 on Bus 60 is decoded by MPU 1 Decode 62 which raises a specific CHIP SEL line 63 to apply a CHIP SEL 1 signal to PROM 50. A read signal R/W1 from MPU 1 to PROM 50 causes the addressed character to be put on the Data Bus 64 through TSD 68. MPU 1 then generates the RAM address (e.g. BIT address 3E00) onto Bus 60 to RAM Address Selector 61. MPU 1 Decode 62 decodes the BIT RAM address and sends a second CHIP SEL 1 signal to TSD 68 and Selector 61. A write pulse R/W1 from MPU 1 to TSD 68 and Address Selector 61 gates the BIT RAM address onto Common Bus 81 and the character data onto Common Data Bus 82 for storage in the address location of BIT in RAM 43. The cycle is repeated for each succeeding PROM and RAM address from MPU 1 until all 288 characters have been read from PROM 50 and stored in the BIT of RAM 43. MPU 1 then puts a BIT flag in MCB.

MPU 2 reads the BIT flag in MCB of RAM 43 and initiates the readout of the necessary microprograms from its ROS 49 for building the BIAT and OT.

In building the BIAT and OT, MPU 2 compares the contents of each storage location of BIT with a code for each character taken from a character table in ROS 49. This is done by addressing each BIT storage location, reading the contents into a buffer register in MPU 2, comparing it with the selected character from ROS 49 in another register in MPU 2. If no bit occurs, the next location is addressed and read out, and so on until a hit is made.

When a hit is made MPU 2 searches BIAT storage for that character in its buffer register. If the character is not found, it stores the character code in a selected BIAT storage location and calculates an Indirect Address from the OT for that character and stores that address in BIAT with the character code. MPU 2 then stores an Occurrence Count OC, in the IA location of OT, determines the belt position in subscans for the BIT address location and stores that value in the corresponding belt position of OT. MPU 2 then also stores a zero in the BIT location which contained the characters stored in BIAT.

When MPU 2 gets a hit for the character in BIT and then upon searching BIAT finds the same character already present, it does not record a new Indirect Address but immediately reads the OT address in BIAT and addresses that location in OT. MPU 2 then increases the OC in OT by 1 and stores the new belt position subscan value in the succeeding belt position of OT.

This procedure is repeated for all storage locations of BIT e.g. 288. When the last position in BIT is addressed, read out, compared, etc. MPU 2 then generates a redundant belt position in for storage in OT. MPU 2 does this by summing the contents of the belt position information in belt position 1 with the 1440 count stored in the REV COUNT register in the free register area of RAM 43. This sum is stored in the last belt position of the OT.

The process is repeated for each distinct character on the type belt until BIT has zeroes stored in all locations in place of the previous BIT character code. When this is accomplished, MPU 2 stores an OT flag in MCB of RAM 43 and generates an MPU 2 IR and then returns to the idle loop microprogram of ROS 49 to await an MPU 2 interrupt request from MPU 1.

Preparatory to printing, MPU 1 during monitoring and after sending a print ready status indication to Host 10 stores a line of print data in the PDB's of RAM 43. Print data may be stored in PDB 1 immediately after as well as during the building of the OT and at other times as well. Print data and control data for a line of data are received by MPU 1 from DCA 44 on Bus 48. The print data is stored in PDB 1 and the control data of the type previously described is stored in PCB 1 and CCB areas of RAM 43. The receipt, formatting and storage of each line of print data is done under microprogram control from ROS 45 in accordance with the addressing, decoding and timing procedures previously described. At the completion of storing a line of print data in PDB 1, MPU 1 stores a print flag along with other control data in the MCB of RAM 43. MPU 2 seeing this flag begins building the SST 1 and PPFT 1 tables in RAM 43.

MPU 2 reads the control data in MCB from PCB 1. From this, MPU 2 computes $S_I$ in subscans which it stores in TCB area of RAM 43. In the case of the first line to be printed, $S_I$ is an arbitrary constant greater than any actual line feed number of subscans. MPU 2 processes the leftmost and rightmost column data in MCB and determines the number of PDB 1 storage locations to be addressed and processed. Beginning with the leftmost character position in PDB 1, MPU 2 addresses BIAT for the Indirect Address of the first character. MPU 2 then looks at the OC in OT and searches for the first belt position occurrence equal to or greater than $S_I$. The alignment subscan is computed using print position adjust values $A_X$ stored in a table in ROS 49.

An Indirect Address IA in PPFT 1 is assigned and stored in the computed subscan location of SST 1. MPU 2 then addresses the IA location in PPFT 1 and stores a 1 for the Print Position PP count and stores the first print position in PPFT 1. The next character in PDB 1 is read and processed in the same manner and its print position stored in PPFT 1 and so on until all printable characters have been processed. When MPU 2 determines that a particular subscan for a character in PDB 1 in SST 1 already has an IA, it checks the PP count in PPFT 1 with COUNT$_{MAX}$ in the register in RAM 43. If they are not equal, MPU 2 increases the PP count for the IA by one and stores the print position in the next subsequent print position of PPFT 1. If the PP count equals COUNT$_{MAX}$ MPU 2 returns to OT and searches for the second character occurrence at or after $S_I$ and computes another alignment subscan which is assigned a new IA in PPFT 1 with the storage of the print position. When the rightmost character has beem processed, MPU 2 then determines the last subscan SE$_{MAX}$ for printing the print data of PPB 1 and stores this in the TCB area of RAM 43 to be used for computing the $S_I$ for the second line of print data. Further information regarding the computations performed by MPU 2 in determining the alignment subscan may be obtained from the copending related application of Bolcavage, Fleek and Marcus.

In the event MPU 2 in searching for a particular character did not find a belt position occurrence which is equal to or greater than $S_I$, i.e. when the OC stands at zero, MPU 2 uses the redundant belt position occurrence for that character. MPU 2 subtracts 05AO which represents 1440 subscans from the redundant belt position value to arrive at the first occurrence belt position value. MPU 2 then computes the alignment subscan for the first occurrence as previously described and proceeds to enter IA and print position data into SST 1 and PPFT 1 at the appropriate location as described.

Upon completion of building SST 1 and PPFT 1, MPU 2 sends a BUILD COMPLETE flag to MCB and generates an interrupt to MPU 2. In response to this IR MPU 1 makes available the next print line as previously described.

Printing of the line of data is under control of MPU 2 executing hammer fire control code from ROS 49 as previously described. This code contains instructions according to which MPU 2 addresses SST at the address indicated by $S_I$. MPU 2 then reads the IA in SST 1 which points to PPFT 1. The print position data is read from PPFT 1 onto Data Bus 82. A CHIP SEL 2 signal to TSD 76 and 79 gates the print position fire data to HPD 90 which sets Print Position Latches 91. Fire tier pulses, as shown in FIG. 6, from Fire Tier Generator 98 are gated through Latches 91 to HDC 92-97 to energize coils 25 as selected. MPU 2 then addresses the next SST 1 address and the process is repeated until the SE$_{MAX}$ subscan of SST 1 has been read out and the print position fire data transmitted to the HPD 90 for setting the print position latches 91. MPU 2 then places a PRINT DONE flag in MCB and sends an MPU 2 IR to MPU 1. In response to this interrupt MPU 1 activates PIA 53 and PTM 1 using CARRIAGE tables from RAM 43 to initiate carriage motor operation and turns on the ribbon drive motor using the RIBBON table from RAM 43. Carriage feedback pulses to PTM 1 are counted and decoded to generate an MPU 1 IR to MPU 1. MPU 1 in response to this IR sends a carriage STOP flag to MCB and an MPU 1 IR to MPU 2. In response to this IR, MPU 2 checks the $S_I$ in TCB and the PSS count register and begins printing at the $S_I$ location of SST 1 when an equal is indicated.

During the construction of the SST 1 and PPFT 1 tables, MPU 1 may have been processing a second line of print data into PDB 2. As previously mentioned, MPU 1 places a flag and related control information for PDB 2 in MCB. During printing of the contents of SST 1 and PPFT 1, MPU 2 searches for this flag and begins the processing of the line of data in PDB 2. MPU 2 reads the flag for PDB 2 and begins building the SST 2 and PPFT 2 tables. In this case, MPU 2 first computes $S_I$ from the line feed information in PCB 2 and the contents of the SE$_{MAX}$ of line 1 in TCB area of RAM 43. The $S_I$ for the second print line is stored in TCB. The processing of the contents of PDB 2 by MPU 2 may begin during the course of the printing operation of the contents of SST 1 and PPFT 1 and may extend into the time interval T during feeding of the forms by the carriage motor under control of MPU 1. In either event, SST 2 and PPFT 2 are constructed in the manner previously described and MPU 2 responds to an IR from MPU 1 indicating the end of carriage motion to the second print line location. Again, MPU 2 reads TCB for the $S_I$ register of line 2 and the PSS COUNT register and begins printing at the $S_I$ location of SST 2 when $S_I$=PSS COUNT.

In accordance with this printer control system it is apparent that processing and printing of data can be performed at much higher rates since it is possible for the printer control system to store more than one line of data and the algorithms therefor so that the printing of succeeding lines of data may occur immediately upon completion of paper feeding. Thus there is no time delay for the microprocessor MPU 2 to begin printing since more than one line of data is always available to be processed into the print algorithm and printing occurs as soon as paper feeding is complete. Furthermore, there is no need to sort the data since the information to be printed is arranged directly in subscan order with an indirect addressing pointing to the subscan print position data. Further advantages are realized by having the MPU 1 control the non-print functions along with receiving and processing the print and control information. The use of a common RAM for storing print of control data including handshaking controls between MPU 1 and MPU 2 is an efficient arrangement coordinating MPU 1 and 2 to perform the printing and non-print functions. The provision of a dedicated bus for MPU 1 to communicate with the nonprint control element in the host system and a separate dedicated bus for MPU 2 to communicate with the print hammer control elements along with the alternate half-cycle accessing of the common bus which is memory mapped into the microprocessors MPU 1 and MPU 2 allows for concurrent overlapping multiple operations which are coordinated and which produce printer operations at much higher speed rates.

While the invention has been particularly shown and described with reference to a preferred embodiment thereof, it will be understood by those skilled in the art that the foregoing and other changes in form and details may be made therein without departing from the spirit and scope of the invention.

We claim:

1. A printer system interconnectable to a host system for receipt of control and printing information for printing lines of data comprising in combination,
   a printer mechanism having a revolving type belt with an array of type elements repeatedly alignable in scan/subscan sequences with a row of print hammers,
   said printer mechanism also including a forms feed mechanism and a drive for an ink ribbon cooperable with said type belt and print hammers to print characters on forms in said printer mechanism and to perform other operations ancillary to printing,
   control means for said printer mechanism including
   a plurality of control elements related to printing operations and non-printing operations of said printer mechanism,
   a first microprocessor operable for receiving control and printing information from said host system and for controlling certain control elements related to non-printing operations of said printer mechanism,
   a first bus interconnecting said first microprocessor with said host system for receiving said control and printing information and with said certain control elements related to said nonprinting operations of said printer mechanism,
   a second microprocessor for controlling printing operations of said printer mechanism,
   a second bus interconnecting said second microprocessor with certain of said control elements related to printing operations of said printer mechanism,
   RAM storage means for storing printing information for plural lines of data along with control information relating to printing operations and nonprinting operations,
   a common bus for interconnecting said first and second microprocessors to said RAM storage means,
   said common bus being accessible by said first and second microprocessors in alternate phases to said RAM storage for storing, processing, and retrieving information to be printed and control information to be used by said first and second microprocessors to perform said printing and nonprinting operations by said printer mechanism.

2. A printer system in accordance with claim 1 in which
   said RAM storage includes
   buffer means constructed by said first microprocessor for storing said control and printing information received from said host system, and
   a plurality of print tables constructed by said second microprocessor containing information usable by said second microprocessor for performing said printing operations.

3. A printer system in accordance with claim 2 in which said print tables of said RAM storage include an occurrence table constructed by said second microprocessor containing character occurrence and belt position information usable by said second microprocessor for arranging said print information in subscan order for printing said plural lines of data stored in said buffer means.

4. A printer system in accordance with claim 3 in which
   said tables in said RAM storage include
   a belt image table containing character information for all of said type elements arranged in the order said type elements appear on said type belt beginning with a reference type element position,
   said belt image table being constructed by said first microprocessor for use by said second microprocessor for constructing said occurrence table.

5. A printer system in accordance with claim 4 in which
   said tables of said RAM storage include
   a belt image address table containing character information representing each distinct character of said type elements on said type belt and address information for each distinct character corresponding to address locations of said occurrence table,
   said belt image address table being constructed from said belt image table by said second microprocessor in conjunction with the construction of said occurrence table.

6. A printer system in accordance with claim 4 in which
   said control elements include a PROM for storing a plurality of belt images corresponding to various interchangeable type belts of said printer mechanism having various arrangements of characters and character occurrences,
   said PROM being accessible through said first bus by said first microprocessor for selectively reading individual belt images via said common bus into said belt image table of said RAM storage.

7. A printer system in accordance with claim 4 in which
   said control elements include
   a PROM containing character and belt position information corresponding to an image of the characters and their location on said type belt
   said PROM being accessible through said first bus by said first microprocessor for constructing said belt image table of said RAM storage.

8. A printer system in accordance with claim 4 in which
   said data information received from said host system via said first bus includes character and belt position information corresponding to an image of the characters and their location on said type belt,
   said first microprocessor being operable for constructing said belt image table in said RAM storage using said character and belt position data from said host system.

9. A printer system in accordance with claim 3 in which
said belt position information of said occurrence table comprises numeric values representing the number of subscans said characters are displaced from a reference position of said type belt.

10. A printer system in accordance with claim 3 in which
said tables of said RAM storage include
a subscan table and a print position fire table jointly constructed by said second microprocessor from print line data in said buffer means and from said character occurrence and belt position information in said occurrence table,
said subscan table also containing coded data arranged in said subscan order by said second microprocessor of the addresses in the print position fire table containing print positions having characters to be printed for each subscan,
said print position fire table containing a count of the print positions to be fired along with print position fire data usable by said second microprocessor for controlling printing operations of said printer mechanism.

11. A printer system in accordance with claim 10 in which
said count in said print position firetable is usable by said second microprocessor for determining whether the number of print fire positions of a subscan equals the maximum number of print positions operable during a related subscan and for reconstructing a new subscan location in said print position fire table from belt position data in said occurrence table in the event said maximum number of print positions is equalled.

12. A printer system in accordance with claim 10 in which
said buffer means has a capacity for storing a plurality of print lines of data from said host system and
said subscan and print position fire tables for a first line of data are constructed by said second microprocessor concurrently with the construction by said first microprocessor of a second print line buffer for a second line of data.

13. A printer system in accordance with claim 12 in which
said RAM contains plural sets of subscan and print position fire tables constructable by said second microprocessor for said plurality of print lines of data stored in said buffer means by said first microprocessor,
said second microprocessor being operable for concurrently constructing a second set of subscan and print position fire tables for a second print line of data while operating said print mechanism to print a first print line of data from a first set of subscan and print position fire tables.

14. A printer system in accordance with claim 12 in which
said second microprocessor determines for each line of data the start subscan $S_I$ corresponding to the first subscan after forms motion is completed and initiates readout of print position fire data and printing beginning with said start subscan $S_I$ location of said subscan table and print position fire table.

15. A printer system in accordance with claim 14 in which
said start subscan $S_I$ for printing said second line of data is determined from forms feed control information representing the time interval of forms motion in subscans provided by said host system and stored by said first microprocessor in said RAM storage and from a determination by said second microprocessor during construction of the subscan tables of said previous line of data of the last subscan $SE_{MAX}$ of said first line of data.

16. A printer system in accordance with claim 14 in which
said start subscan $S_I$ for printing said second line of data is determined by said second microprocessor in accordance with the following expression $$S_I = T + SE_{MAX},$$

where
T is the time interval during paper motion translated into subscans
$SE_{MAX}$ is the last subscan for printing a preceding line of data.

17. A printer system in accordance with claim 3 in which
said belt position information in said occurrence table represents the number of subscans each character is displaced from a reference character on said type belt.

18. A printr system in accordance with claim 3 in which
said belt position information in said occurrence table includes a redundant belt position for each character in said occurrence table.

19. A printer system in accordance with claim 18 in which
said redundant belt position is the last belt position information in said occurrence table.

20. A printer system in accordance with claim 18 in which
said redundant belt position for each character in said occurrence table is redundant relative to one other belt position in said occurrence table.

21. A printer system in accordance with claim 20 in which
said redundant belt position is redundant relative to the first belt position of said characters in said occurrence table.

22. A printer system in accordance with claim 20 in which
said redundant belt position is defined by redundant belt position information consisting of the number of subscans the first character is displaced from a reference belt position on said type chain plus the number of subscans in one complete revolution of said type belt.

23. A printer system in accordance with claim 21 in which
said belt position information for said redundant belt position is computed by said second microprocessor from the number of subscans of the first belt position of said occurrence table and the number of subscans in one complete revolution of said type belt.

24. A printer system in accordance with claim 23 in which
said number of subscans in one complete revolution of said type belt is 1440.

25. A printer system in accordance with claim 2 in which
    said control elements includes a carriage motor drive for operating said forms feed mechanism in line space increments for printing lines of data from said host system, and
    said tables in said RAM storage include carriage control tables containing data usable by said first microprocessor for operating said carriage motor drive to obtain selectively variable line space incremental motion of a forms medium in said printer mechanism.

26. A printer system in accordance with claim 25 in which
    said plurality of tables constructed by said second microprocessor for controlling said printing operation are constructable at least in part during the interval of operation of said carriage motor drive for obtaining incremental motion of a forms medium.

27. A printer system in accordance with claim 25 in which
    said control elements include carriage timing means operatively connected to provide timing pulses to said carriage motor drive,
    said carriage timing means being controllable by said first microprocessor through said first bus in accordance with carriage control information in said RAM storage.

28. A printer system in accordance with claim 27, in which
    said carriage control information further includes line feed and density information stored in said RAM storage for use by said first microprocessor in controlling the operation of said carriage timing means.

29. A printer system in accordance with claim 28 in which
    said carriage timing means is a programmable timer, operable in accordance with said tables stored in said RAM storage.

30. A printer system in accordance with claim 2 in which
    said RAM storage further includes a mechanism control storage area accessible to said common bus by said first and second microprocessors,
    said mechanism control storage area containing control and status information exchangeable between said first and second microprocessors for operation of said control elements in performance of said printing operations of said printer mechanism.

31. A printer system in accordance with claim 2 in which
    said buffer means in said RAM storage comprises plural print line buffers for concurrently storing plural print lines of data received from said host system and
    said plurality of tables in said RAM storage comprises plural subscan and print position fire tables constructible in sequence by said second microprocessor to contain subscan ordered print position fire data for printing corresponding print lines of data in said plural buffers, and
    a common occurrence table usable by said second microprocessor for constructing said plural subscan and print position fire tables for plural print lines of data stored in said plural print line buffers.

32. A printer system in accordance with claim 2 in which
    said control elements include ribbon timing means connectable to said ribbon drive of said printer mechanism,
    said ribbon timing means being controllable by said first microprocessor through said first bus in accordance with ribbon control data stored in said RAM storage.

33. A printer system in accordance with claim 32 in which
    said ribbon timing means is a programmable timer operable by said first microprocessor in accordance with said ribbom control data stored in said RAM storage.

* * * * *